Patented Dec. 17, 1935

2,024,990

UNITED STATES PATENT OFFICE 2,024,990

LUBRICANT

Gus Kaufman, Beacon, N. Y., assignor to The Texas Company, New York, N. Y., a corporation of Delaware No Drawing. Application December 7, 1932, Serial No. 646,153

4 Claims. (Cl. 87—9)

This invention relates to improvements in lubricants and pertains more particularly to a method of solidifying neat's-foot oil and to a neat's-foot oil compound or grease suitable for use as a lubricant and as a preservative for packings of bearings, such as ball and roller bearings and the like.

In machinery having certain parts subjected to rapid motion and requiring bearings of high efficiency it is customary to pack the bearings with suitable packing material, such as leather or felt, to protect the bearings against dirt and grit and to retain the lubricant in place. For example, in the ball bearings of automobile wheels there are usually provided rings, gaskets and the like made of leather, felt, or other suitable material which snugly enclose and form a seal about the bearings. In order to prevent the packings from becoming hard and cracking it is necessary to saturate them with a preservative which will keep them soft and pliable. Neat's-foot oil is a good preservative for such purposes but due to its high fluidity it tends to leak out of the bearings in a short time, particularly if the temperature rises.

I have found that by converting neat's-foot oil into a solidified composition a much improved product for the purposes herein described may be obtained. In this way a composition having a relatively high melting point and which will not leak from the bearings may be produced. Also, the beneficial preservative qualities of the neat's-foot oil will be retained and at the same time I may provide an efficient lubricant for the bearings themselves.

The usual method heretofore of solidifying vegetable or animal oils has been to hydrogenate the oil until a material of suitable hardness was obtained. This method, however, is quite expensive and while it may be feasible for valuable products, such as edible oils, it is not practical as a step in the preparation of modern industrial greases.

In accordance with the present invention, instead of hydrogenating the oil I have now discovered that substantially the same effect for my purposes is obtained by partially saponifying the oil. The resultant soap produced in the oil will increase the hardness and provide a solidified material resembling a grease in appearance and function while the unsaponified oil retains its original qualities, particularly for preserving packings. Furthermore, according to the invention, I may blend the partially saponified neat's-foot oil with a mineral lubricating oil to produce a material of the proper consistency and to improve the lubricating properties thereof. Also, I may, if desired, incorporate in the compounds a suitable antioxidant to prevent the development of rancidity and to prevent general deterioration of the finished product in storage.

The following examples will illustrate the invention but the invention is not restricted to the specific examples given.

Example 1

A sample of neat's-foot oil having a saponification number of 195 was saponified by slowly adding thereto over a period of about 3 hours about 13.0% by weight of a 43% aqueous solution of caustic soda while the mixture was maintained at a temperature of about 300°–400° F. The resulting product, after cooling, tested by actual analysis 52.5% of soap, 45% of unsaponified fatty acids and neutral fat, and showed a penetration of 164 (A. S. T. M. Method D—127—27T) and a melting point of 280° F. (drop point method).

Example 2

A mixture containing equal quantities of neat's-foot oil and a pale mineral oil with a viscosity of 187 seconds Saybolt at 100° F. was saponified by heating for about four hours with about 9.2% of a 43% aqueous solution of caustic soda. The finished product by actual analysis tested 34.2% soap, 15.6% fatty acids and neutral fat and 49.3% mineral oil. The product had a penetration of 230 (A. S. T. M. Method D—217—27T) and a melting point of 274° F. (drop point method).

Example 3

A compound was made similarly to that in Example 2 except that approximately 13.64% by weight of caustic soda solution was used. This product showed by actual analysis 41.1% of soap, 8.1% fatty acids and neutral fat and 45.6% of mineral oil. It tested 208 penetration (A. S. T. M. Method D—217—27T) and 314° F. melting point (drop point method).

Instead of using the specific amounts of ingredients given in the examples I may vary the proportions within quite wide limits. In general, a partially saponified neat's-foot oil compound containing 10–85% of soap and 90–15% unsaponified neat's-foot oil is suitable and to this I may add 30–50% of a pale mineral oil. The mineral oil may be added to the neat's-foot oil before the saponification operation or it may be blended with the saponified product. A mineral oil with a viscosity from 150–1000 seconds Saybolt at 100° F. may be used although I prefer one with a viscosity of about 180–300 seconds Saybolt at 100° F. Compositions obtained in this way may have melting points from about 150°–400° F. and penetrations varying from about 250–100.

It is contemplated also that alkalies other than caustic soda, for example potassium hydroxide, or alkaline earth materials, such as calcium, magnesium, or barium hydroxides, may be used.

Compositions such as those above described, under certain conditions, may develop rancidity or otherwise deteriorate in storage and in order to stabilize them I may add antioxidants thereto. For example, for a product prepared as described in Example 1 I have added 0.5% by weight of beta-naphthol and the development of rancidity was found to be substantially suppressed as compared with a sample containing no antioxidant. Improved results have also been obtained by using 1% by weight of a sodium thiosulfate aqueous solution. Other suitable antioxidants, such as sodium sulfite, alpha-naphthylamine, aldol-alpha-naphthylamine, paraphenylene diamine, indophenol, hydroquinone, etc. are contemplated for use, according to the invention.

In the application of the compounds to the packings, according to the invention, I may treat the packings before they are placed in the machine by applying the compound thereto so that they are substantially saturated. It is preferable, however, whether the packings are previously treated or not, to provide a supply of the lubricant in the vicinity of and where it will be accessible to the packings to preserve them during use. For the latter purpose the bearings may be initially filled with the compound and thereafter additional quantities added periodically to replace that lost or consumed. The compounds in this way serve both as a lubricant for the bearings and as a preservative for the packings.

According to another method of application I may provide a supply of the preservative adjacent to the packing and on the side opposite the bearings. In this case the material serves essentially as a preservative only for the packings.

While the invention has been described with particular reference to the treatment of packings of bearings, it is to be understood that the invention is not limited to the specific application mentioned in detail in the specification. Accordingly, the treatment of any kind of leather, leather goods and like materials is contemplated as coming within the scope of the invention.

Obviously many modifications and variations of the invention, as hereinbefore set forth, may be made without departing from the spirit and scope thereof, and therefore only such limitations should be imposed as are indicated in the appended claims.

I claim:

1. A grease consisting essentially of a mixture of neat's-foot oil, caustic alkali soap of neat's-foot oil and 30–50% of mineral lubricating oil, said grease being solid at ordinary temperature, homogeneous and substantially dehydrated.

2. A substantially dehydrated grease comprising about equal amounts of neat's-foot oil and caustic alkali soap of neat's-foot oil, said grease being solid at ordinary temperature.

3. A grease consisting essentially of a mixture of neat's-foot oil, caustic alkali soap of neat's-foot oil and mineral lubricating oil, said grease being homogeneous and substantially dehydrated and containing upwards of about 35% soap.

4. A grease consisting essentially of a mixture of neat's-foot oil, 35–40% of caustic alkali soap of neat's-foot oil and 45–50% mineral lubricating oil, said grease being homogeneous and substantially dehydrated.

GUS KAUFMAN.